(12) United States Patent  
Gazsi (10) Patent No.: US 6,563,867 B2  
(45) Date of Patent: May 13, 2003

(54) ARRANGEMENT FOR ANALYZING THE NONLINEAR PROPERTIES OF A COMMUNICATION CHANNEL

(75) Inventor: Lajos Gazsi, Düsseldorf (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/080,414

(22) Filed: Feb. 22, 2002

(65) Prior Publication Data

US 2002/0167996 A1 Nov. 14, 2002

Related U.S. Application Data

(63) Continuation of application No. PCT/EP00/08859, filed on Sep. 11, 2000.

(30) Foreign Application Priority Data

Sep. 14, 1999 (DE) .......................... 199 44 054

(51) Int. Cl.⁷ .......................... H04B 17/00; H04B 3/46; H04Q 1/20
(52) U.S. Cl. .................. 375/224; 714/714; 714/715; 379/22.02; 379/22.03
(58) Field of Search ................... 375/224, 226, 375/227, 285, 257, 346, 349, 350, 377; 324/76.11; 714/712, 714, 715; 379/1.01, 22.02, 24, 27.03; 455/67.1, 67.4

(56) References Cited

U.S. PATENT DOCUMENTS

| | | | | |
|---|---|---|---|---|
| 4,273,970 A | * | 6/1981 | Favin et al. ............ 324/76.12 |
| 4,301,536 A | * | 11/1981 | Favin et al. ............ 714/714 |
| 4,417,337 A | * | 11/1983 | Favin et al. ............ 714/714 |
| 4,768,203 A | * | 8/1988 | Ingle ..................... 375/227 |
| 5,515,398 A | | 5/1996 | Walsh et al. |
| 5,731,993 A | * | 3/1998 | Wachs et al. ........... 702/109 |
| 5,748,001 A | | 5/1998 | Cabot |

FOREIGN PATENT DOCUMENTS

| | | |
|---|---|---|
| EP | 0 397 535 | 11/1990 |
| JP | 0560169923 AA | 12/1981 |

OTHER PUBLICATIONS

Gazsi, L. "On the Reduction of Hardware in Digital Modulators," IEEE Transactions on Communications, vol. COM–27, No. 1, Jan. 1979.

Ojanperä et al., "Wideband CDMA for Third Generation Mobile Communications", Artech House Publishers, 1998, pp. 310–311.

* cited by examiner

*Primary Examiner*—Jean Corrielus
(74) *Attorney, Agent, or Firm*—Marshall, Gerstein & Borun (57) ABSTRACT

An arrangement to analyze the nonlinear properties of a communication channel that uses a test signal having a number of tones. The test signal is transmitted via the communication channel to be evaluated. For the individual tones of the test signal, equidistant tone frequencies are selected, some of these tone frequencies not being used for the test signal. By the use of frequency shifters in the form of digital modulators, which shift the frequency spectrum of the transmitted test signal to zero by in each case one tone frequency value that is not used, nonlinear interference can be determined with the aid of a low-pass filter.

21 Claims, 8 Drawing Sheets

ARRANGEMENT FOR ANALYZING THE NONLINEAR PROPERTIES OF A COMMUNICATION CHANNEL

RELATED APPLICATIONS

This patent application is a continuation of under 35 U.S.C. §120 from International Application Ser. No. PCT/EP00/08859, which was filed on Sep. 11, 2000.

BACKGROUND

The present invention relates to an arrangement for analyzing the nonlinear properties of a communication channel.

It is known in the conventional art to generate test signals (probing signals) for the purpose of determining the nonlinear properties of communication channels or their analog preliminary stages, the test signal transmitted via the communication channel being evaluated in each case. In the past, sinusoidal signals, in combination with bandpass filters have been used to determine the nonlinear properties of communication channels. In this case, however, reliable determination of the nonlinear response of the communication channel is possible only when a multiplicity of different measurements is carried out in conjunction with different frequencies of the test signal. This mode of procedure is, therefore, relatively complicated, as well as costly and time consuming.

In order to test the nonlinear properties of the communication channel, the test signal should have a relatively large number of peaks in a suitable amplitude range. It has therefore been proposed in U.S. Pat. No. 5,515,398 to measure the power of the signal peaks and compare it with the root mean square average value (RMS) of the power of the test signal. A test signal for analyzing the nonlinear properties of the corresponding communication channel is optimized whenever it corresponds to a minimum ratio of the signal peak power to the RMS value. This ratio value is also denoted as the PAR (Peak-to-RMS average ratio) value. In the signal range of interest, a test signal with a minimum PAR value produces the strongest interference generated by nonlinearities in the communication channel, with the result that this interference can be most effectively detected and evaluated.

As described in U.S. Pat. No. 5,515,398, the test signal is composed of a multiplicity of individual tones whose tone frequencies lie in each case inside what is termed the Nyquist interval [0 . . . Fs/2], where Fs corresponds to the sampling frequency of the test signal. Some of these discrete tone frequency values are not used for the test signal, however. In the case of those tone frequencies not used for the test signal, intermodulation distortions and harmonic distortions are produced by the nonlinear properties of the communication channel or its analog preliminary stage. The strength of these nonlinear distortions in relation to the signal amplitude in the case of those tone frequency values that were not omitted and, thus, used for the test signal, can be used as a measure to evaluate the nonlinearity of the communication channel.

In order to determine the previously named nonlinear interference, it is customary to use an evaluation or detector circuit that comprises a bandpass filter of high selectivity, such as complex FIR filter or IIR filter of higher order, for example. Thus, the design of the detector circuit is relatively complicated.

SUMMARY OF THE INVENTION

The present disclosure proposes an arrangement for analyzing the nonlinear properties of a communication channel that affords reduction of the outlay on circuitry over the previously mentioned evaluation or detector circuits.

According to an aspect of the disclosed arrangement for analyzing nonlinear properties of a communication channel, a test signal generator device is encoded and configured to generate a test signal comprised of a plurality of different tones and send the test signal via the communication channel. The tone frequencies of each of the plurality of different tones of the test signal are set to values from the set of $i*Fn/n$ where $i=1 \ldots n/2-1$ and Fs denotes the sampling frequency and wherein at least one of the tone frequency values from the set of $i*Fs/n$ is not used for a tone of the test signal. An evaluation device is also included and configured to receive and evaluate the test signal transmitted via the communication channel. The evaluation device includes a first detector unit configured to detect the interference produced by the communication channel for tone frequency values that are not used for the test signal. Also included in the evaluation device is a second detector unit configured to detect test signal amplitudes occurring for each of the tone frequency values used. Further, a comparator unit is included in the evaluation device to relate respective output signals of the first and second detector units to one another in order to determine the nonlinear properties of the communication channel. Moreover, the first detector unit has one or more frequencies spectrum shifting units configured to shift the frequency spectrum of the test signal transmitted via the communication channel by the individual tone frequency values not used for the test signal. The first detector unit further includes one or more low-pass filters connected downstream of corresponding frequency spectrum shifting units in order to subject each frequency-shifted test signal to low-pass filtering. The first detector unit outputs a sum of the individual frequency-shifted and low-pass filtered test signals as an output signal to the comparator unit.

DETAILED DESCRIPTION OF THE PREFERRED EMBODIMENTS

Figure 1:
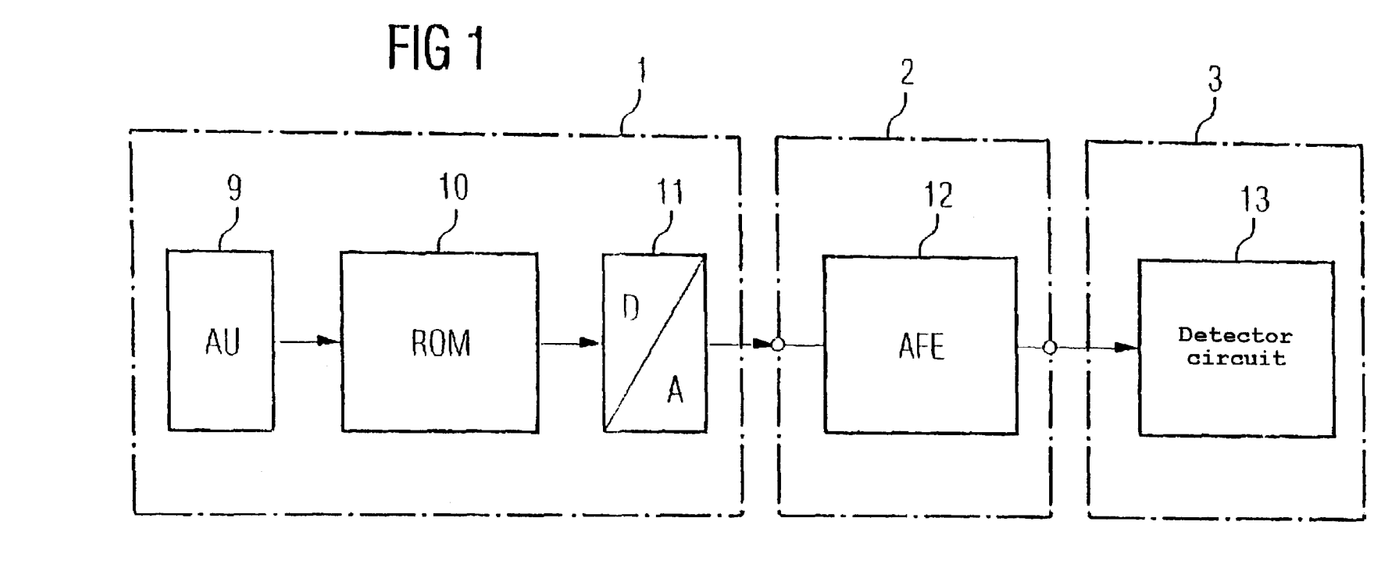
FIG. 1 shows a block diagram illustrating the basic circuit design of an arrangement according to the present disclosure.

FIG. 1 illustrates a basic design of an arrangement according to the present disclosure for analyzing the nonlinear properties of a communication channel. The arrangement comprises a test signal generator 1, comprised of components 9, 10 and 11, which will be explained in more detail below. The test signal generator is provided for generating a test signal that is transmitted via a communication or read/write channel 2 that is to be tested, as well as a detector 3 or evaluation circuit 13 that detects the test signal transmitted via the communication channel 2 and evaluates it, in order as a function thereof to determine the nonlinear properties of the communication channel 2 or an analog preliminary stage 12 (analog front end (AFE)) included therein.

Typically, the signal generator is located in a modem 1 connected to a computer system. Likewise, the detector circuit 13 is located in a modem 3 connected to a further computer system.

As is shown in FIG. 1, in the case of the exemplary arrangement shown in FIG. 1, the test signal generator comprises a read only memory (ROM) 10 which is addressed by an address unit (AU) 9, as well as a digital/analog converter 11 for the purpose of converting the digital samples read out of the memory 10 into the analog test signal.

The test signal generated by the test signal generator 1 comprises a specific number of tones whose frequencies are selected from the set i*Fs/n where i=1 . . . n/2−1 and Fs denotes the sampling frequency with which the test signal is sampled at the receiving end by the detector circuit 13. It follows that consideration is only given for the individual tones of the test signal to equidistant tone frequencies which lie within what is termed the Nyquist interval [0 . . . Fs/2]. However, not all possible tone frequencies i*Fs/2 are used in generating the test signal, but some of these equidistant tone frequencies are omitted in order to detect the nonlinear interference caused by the communication channel 2 or its analog preliminary stage 12.

In accordance with a an exemplary embodiment, it is proposed to assemble the test signal from seven cosine frequencies, each cosine frequency being allocated a specific amplitude value and phase value. In this case, the test signal comprises 24 samples in the time domain. The following table lists the cosine frequencies (referred to the sampling frequency Fs), proposed in accordance with this exemplary embodiment for the test signal, with their relative amplitude values and their phase values.

| Cosine frequency | Amplitude | Phase |
| --- | --- | --- |
| Fs/24 | 1 | 0° |
| 3*Fs/24 | 1 | 0° |
| 5*Fs/24 | 1 | 180° |
| 6*Fs/24 | 1 | 180° |
| 7*Fs/24 | 1 | 0° |
| 9*Fs/24 | 0.85 | 180° |
| 11*Fs/24 | 0.35 | 180° |

It follows that the tone frequencies situated at 2* Fs/24, 4* Fs/24, 8* Fs/24 and 10* Fs/24 are not used for the test signal.

Figure 2:
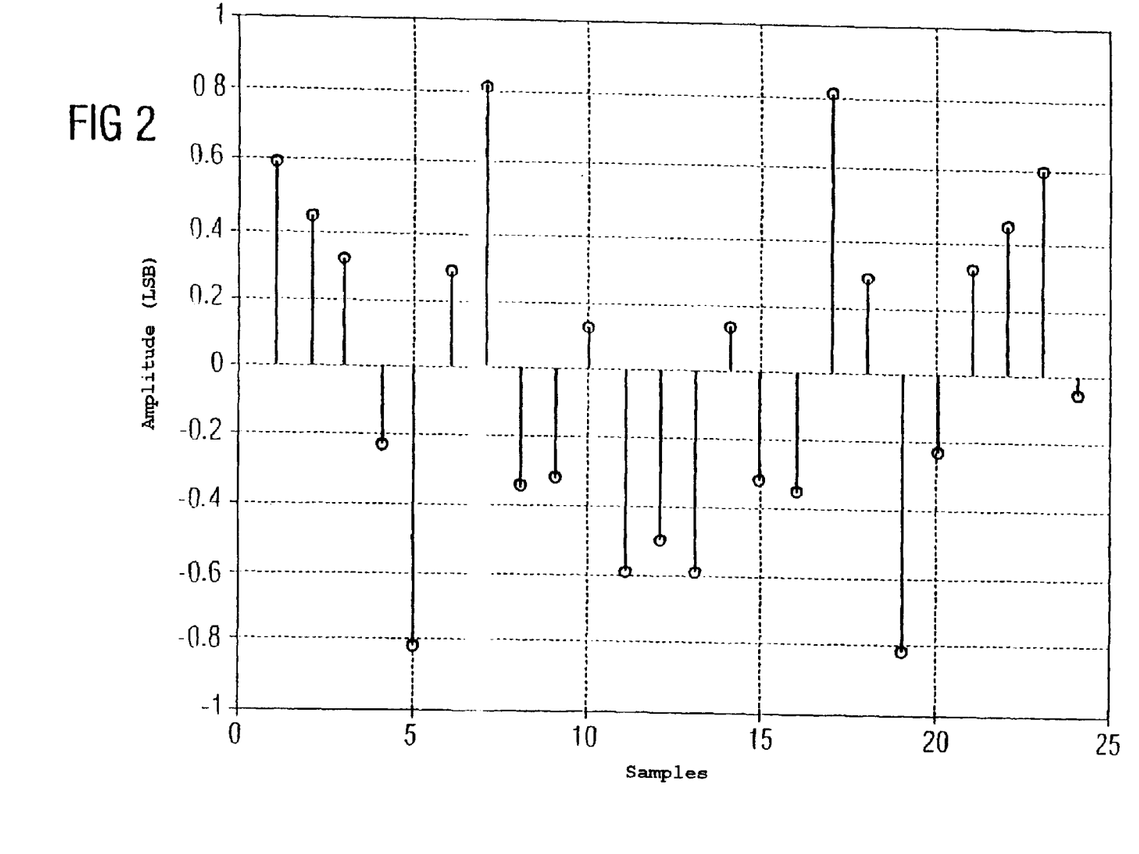
FIG. 2 shows a period of a test signal generated by the arrangement illustrated in FIG. 1 in the time domain.
Figure 3:
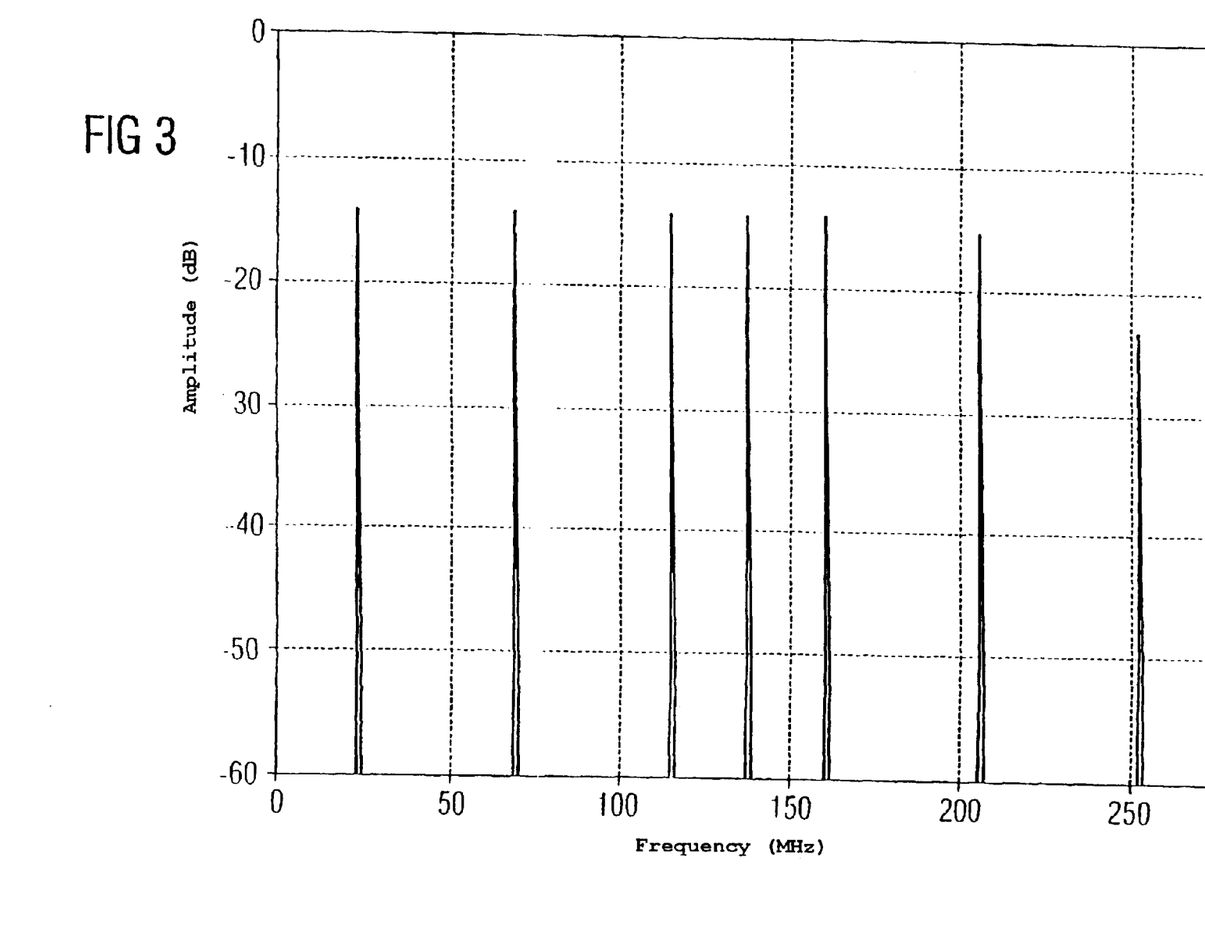
FIG. 3 shows a discrete frequency transform of the test signal.

The period of the test signal comprising 24 samples thus produced is illustrated in the time domain for this exemplary embodiment in FIG. 2, while the corresponding discrete frequency transform of the test signal is plotted in FIG. 3. The tone frequency values at 2* Fs/24, 4* Fs/24, 8* Fs/24 and 10* Fs/24 not used for the test signal are particularly to be recognized from FIG. 3. Furthermore, the amplitude of the two last tone frequencies at 9* Fs/24 and 11*Fs/24, which is reduced by comparison with the first five tone frequencies, can be taken from FIG. 3. The reduced amplitude of these frequency values contributes to a simpler design of the A/D converter normally included in the analog preliminary stage 12 of the communication channel 2.

The test signal assembled in accordance with the previously described embodiment has a PAR value of approximately 4.51 dB, given the phase relationships specified in the above table. As is shown in FIG. 1, the individual samples of the test signal can be obtained by addressing the memory 10 in which the individual samples of a period of the test signal are stored in quantized form. When use is made of a word length of 6 bits, a total of 64 different values are available for quantizing the individual samples, and so a value range of {−32, −31, . . . , −1, 0, 1, . . . 31}, for example, can be selected for the individual samples. The following occupancy of the memory 10 therefore results for the samples shown in FIG. 2:

| Memory index | Value | Memory index | Value |
| --- | --- | --- | --- |
| 0 | 19 | 12 | −19 |
| 1 | 14 | 13 | 4 |
| 2 | 10 | 14 | −10 |
| 3 | −7 | 15 | −11 |
| 4 | −26 | 16 | 26 |
| 5 | 9 | 17 | 9 |
| 6 | 26 | 18 | −26 |
| 7 | −11 | 19 | −7 |
| 8 | −10 | 20 | 10 |
| 9 | 4 | 21 | 14 |
| 10 | −19 | 22 | 19 |
| 11 | −16 | 23 | −2 |

It may be seen from the above table that the values stored under the addresses 0–10 correspond in reverse sequence to the values stored under the addresses 12–22. A particularly simple implementation of the address unit 9, and a smaller space requirement for the memory 10, can therefore be achieved when the address unit 9 is configured as a simple counter which repeatedly counts from 0 to 11 and down again to 0, and inserts the value −2 as last element in each case at the end of a counting cycle. In this case only 12 addresses are required in the memory 10 in order to generate the samples of a test signal period.

Figure 4:
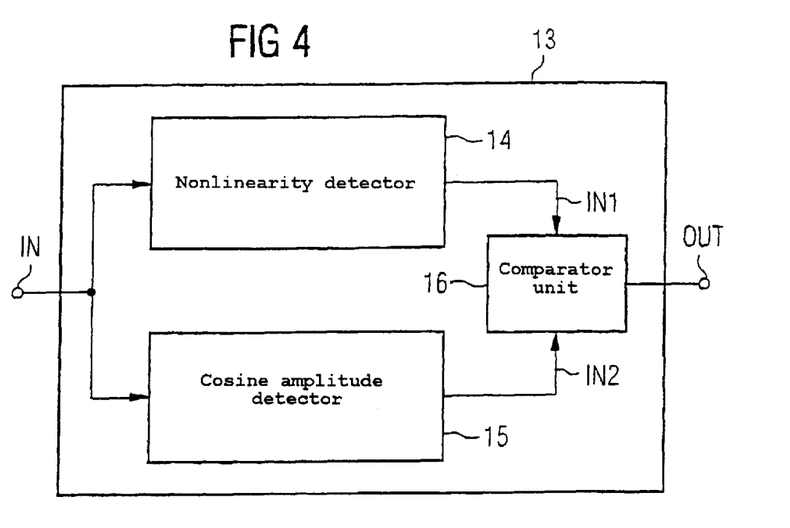
FIG. 4 shows the design of the detector circuit illustrated in FIG. 1.

The overall design of the detector circuit 13 is illustrated in FIG. 4 with the aid of a simplified block diagram. The detector circuit 13 comprises, in essence, three components. Specifically, a nonlinearity detector 14 is included that detects the intermodulation distortions, which are produced by the communication channel 2 in the case where the tone frequency values are not used for the test signal, and harmonic distortions. A cosine amplitude detector 15 is also included that detects the signal amplitudes occurring for the case where the tone frequency values are used for the test signal. The third component is a comparator unit 16 that intercompares or relates the respective output signals IN1 and IN2 of the two detectors 14 and 15 to one another, in order to determine the nonlinear properties of the communication channel 2. As will be explained in more detail below, it is possible to achieve a simpler design of the detector circuit 13 within the disclosed apparatus when, in particular, the ratio of the sampling frequency Fs to the lowest possible tone frequency 1* Fs/N for generating the test signal is selected in such a way that the factor N is a whole number that may be represented as the product of relatively small numbers (in the present case N=2*3*4=24).

Figure 5:
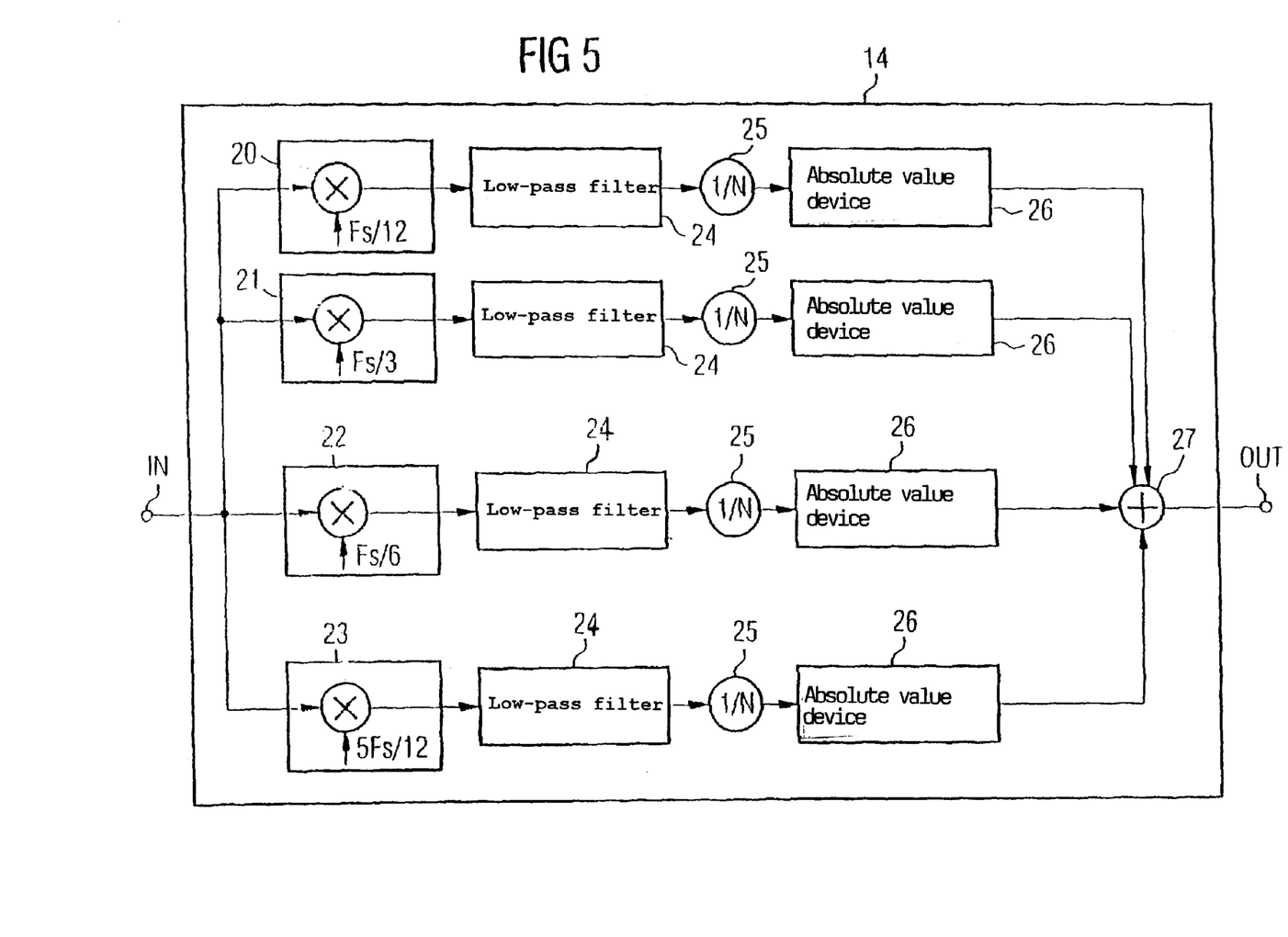
FIG. 5 shows a block diagram of a possible implementation in circuitry of a nonlinearity detector illustrated in FIG. 4.

FIG. 5 illustrates a possible design of the nonlinearity detector 14, which comprises a digital modulator on the input side for each tone frequency not used for the test signal. In the present case, four modulators 20–23 are therefore provided, each being fed as a carrier signal frequency one of the tone frequencies not used for the test signal. The digital modulator 20 thus mixes the test signal transmitted via the communication channel 2 and received by the detector circuit 13 with the carrier frequency 2* Fs/24=Fs/12, while the further digital modulators 21–23 mix the received test signal with 4* Fs/24=Fs/6, 8* Fs/24=Fs/3 and 10* Fs/24=5* Fs/12. Thus, each of the digital modulators 20–23 effects a shift in the frequency spectrum of the received test signal that corresponds to the respective carrier frequency value. Accordingly, the nonlinear components of the test signal that occur, given the corresponding carrier frequency value or tone frequency value, may in each case be filtered out with the aid of a downstream low-pass filter 24 of simple design, and, thus, be detected. Due to the particular disclosed design of each low-pass filter 24, which will be explained below in more detail, a frequency divider 25 with the divider factor N is connected downstream of each low-pass filter 24, N corresponding to the number of the samples per test signal period (in the present case, N=24). The individual output signals of the low-pass filters 24 or of the frequency divider 25 are fed in each case to an absolute value device 26 that determines the absolute value or the power of the individual carrier frequencies (or tone frequencies not used for the test signal). The power components thus determined are added up with the aid of an adder 27 and fed to the comparator unit 16.

Because of the simple relationship of the individual carrier frequencies to the sampling frequency Fs, the individual digital modulators 20–23 may be implemented in the form of what is termed full array multiplication with a relatively low outlay for the circuitry. Each modulation is equivalent to multiplying the corresponding sample of the received test signal by a specific constant number sequence.

Thus, the modulation with Fs/3, for example, can be implemented with the aid of periodic modification by the values 1, ½ and −½ (i.e., a specific sample is multiplied by 1, the next sample following is multiplied by ½, and the next sample is multiplied by −½. Subsequently, the cycle begins again from the start such that the next sample is multiplied again by 1, etc.). The digital modulator 21 may therefore be implemented by the circuit shown in FIG. 6A, a multiplexer driven by a modulo 2 counter switching one of its inputs through to its output as a function of the counter reading. The instantaneous sample of the received test signal is present at the input of the multiplexer, both unchanged (that is to say multiplied by the factor 1 ) and multiplied by the factors ½ and −½. The multiplication by the factors ½ and −½ may be implemented by simple bit shifting operations of the quantized sample.

A similar design is also possible for the other digital modulators 20, 22 and 23 of the nonlinearity detector 14, in which case a buildup by means of bit shifting operations in combination with multiplexers is likewise applied, and there is, thus, no need for multipliers of relatively complex design.

Figure 6A:
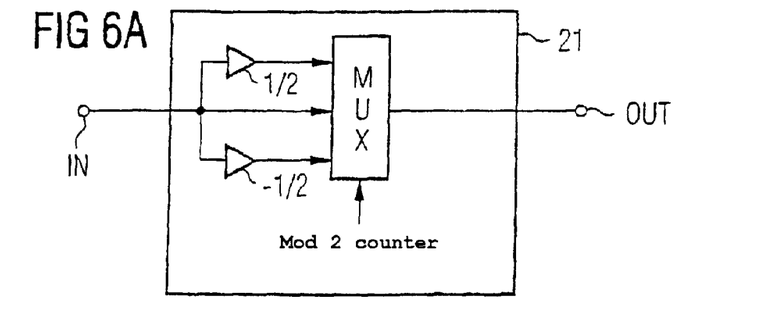
FIGS. 6A–6C show block diagrams of digital modulators, as illustrated in FIG. 5, for the carrier frequencies Fs/3, Fs/6 and 5*Fs/12.
Figure 6B:
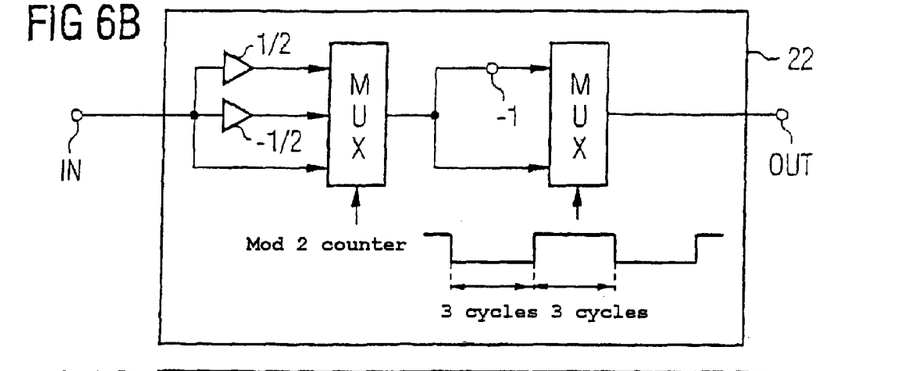

FIG. 6B illustrates an exemplary design of the digital modulator 22 modulating with Fs/6. In this case, the samples are multiplied periodically by the factors ½, −½, −1, −½, ½ and 1, and so there is a need on the output side for an additional multiplexer, which is driven by the control signal illustrated in FIG. 6B. The additional multiplexer switches through at its output either its unchanged input signal (during the first three cycles of a multiplication period) or its input signal multiplied by −1 (during the last three cycles of a multiplication period). The input-side multiplexer is driven by a modulo 2 counter similar to the counter explained above in connection with FIG. 6A.

Figure 6C:
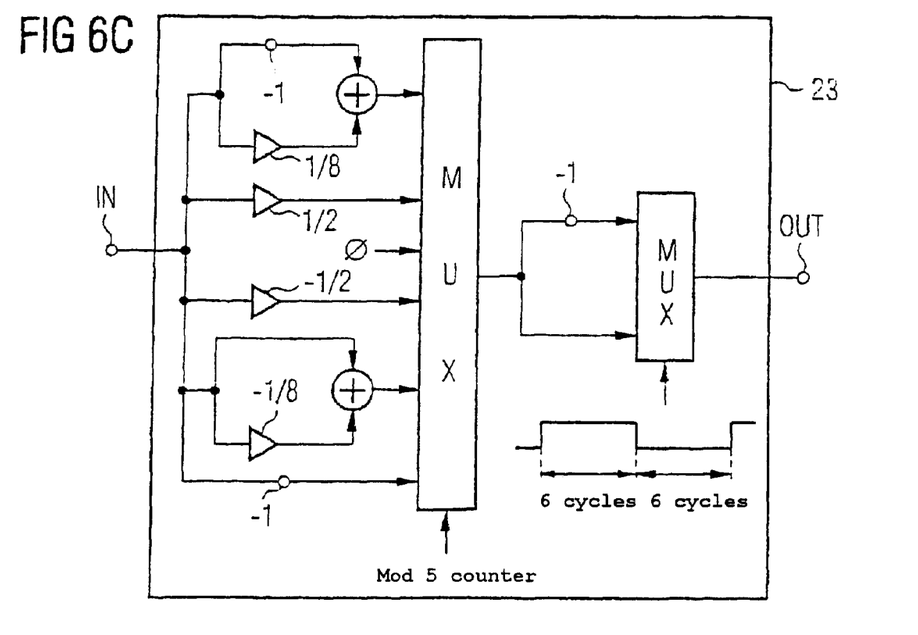

The modulation with 5* Fs/12 may, by contrast, be implemented by periodic multiplication of the test signal samples by −k, ½, 0, −½, k, −1, k, −½, 0, ½ −k and 1, the factor k in this case being k=0.866025403. In the case of the use of a 6 bit presentation, the irrational factor k can be approximated with an error of less than 0.9% by the factor 1−⅛. The design of the corresponding digital modulator 23 resulting therefrom is illustrated in FIG. 6C. In this case, there is also a need on the output side for a further multiplexer, which is driven by the signal represented below this further multiplexer in FIG. 6C. This further multiplexer switches through its unchanged input signal during the first six cycles of a multiplication period, and switches through its input signal, multiplied by −1, at its output during the last six cycles of a multiplication period. The input-side multiplexer is driven by a modulo 5 counter such that one of the six different input signals of this input-side multiplexer is selected as a function of the counter reading of this modulo 5 counter.

The design of the digital modulator 20 (carrier frequency Fs/12) is not illustrated in FIG. 6. However, it may be implemented in a similar way to the digital modulator 23 (carrier frequency 5* Fs/12).

All the digital modulators 20–23 of the nonlinearity detector 14 therefore manage without a multiplier. Moreover, it is noted that the multiplications by 1, −1 or 0 may also be implemented entirely correct by bit shifting operations of the rearmost bits by ½, −½, ⅛ and −⅛. It follows that the digital modulators 20–23 produce neither harmonic distortions nor round-off errors.

Figure 7:
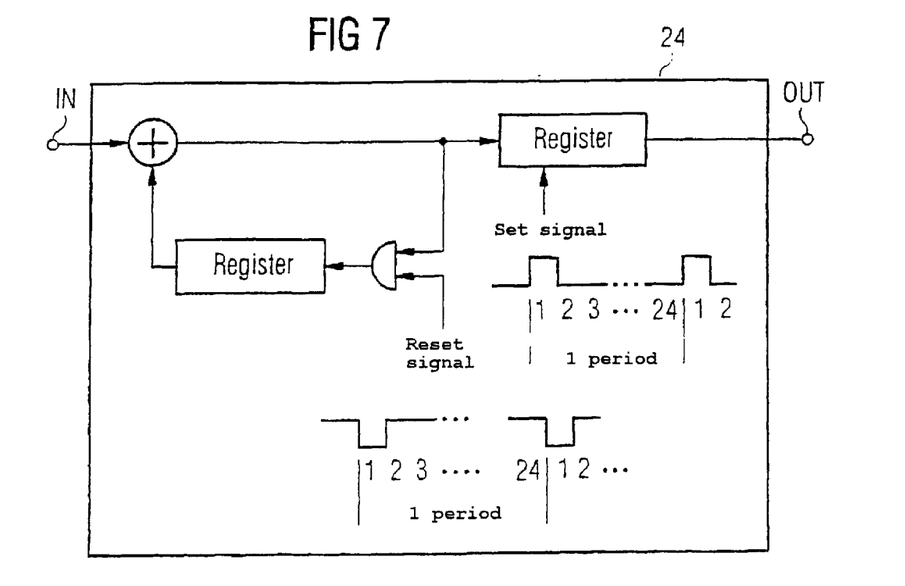
FIG. 7 shows a block diagram of a possible implementation in circuitry of a low-pass FIR filter illustrated in FIG. 5.

The low-pass filters 24 may also be implemented very easily. The low-pass filters 24, which are illustrated in FIG. 7, may be implemented in the form of a filter with a sliding averaging of length N, N corresponding to the period length of the test signal (N=24 in the present case). Consequently, the low-pass filter 24 outputs only one filter value per period and, thus, the frequency dividers 25 (see FIG. 5) respectively connected downstream must correspondingly have the divider factor N. By virtue of the structure shown in FIG. 7 comprised of the low-pass filter having an adder on the input side, two registers and an AND gate, the input data are added up in each case over one period of the test signal and the sum value after N adding operations is output via the register on the output side, which is driven by the set signal shown in FIG. 7. Subsequently, the adder is reset, that is to say cleared, with the aid of the reset signal, likewise shown in FIG. 7, which is applied to the AND gate, so that the next adding cycle can begin. The register on the output side ensures that only one sum value is output per adding cycle.

Figure 8:
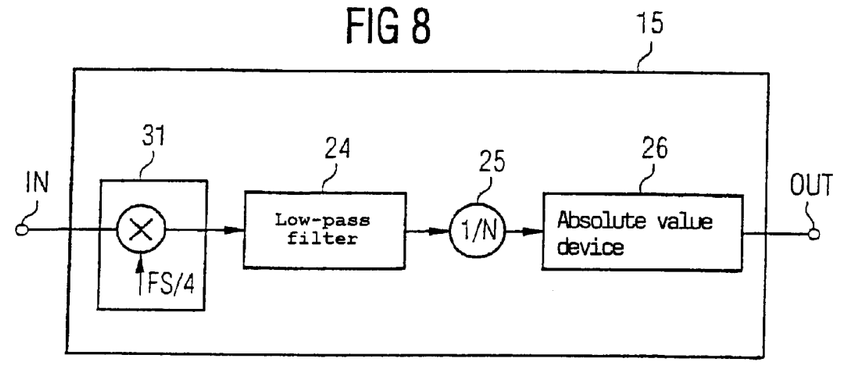
FIG. 8 shows a block diagram of a possible implementation in circuitry of a cosine amplitude detector illustrated in FIG. 4.

A possible design of the cosine amplitude detector 15 shown in FIG. 4 is illustrated in FIG. 8. As has already been mentioned, the task of the cosine amplitude detector 15 is to determine the signal strength or amplitude of the test signal in the case of the tone frequencies actually used for the test signal. For this purpose, the frequency spectrum of the received test signal is shifted again by using a digital modulator 31 into a cosine frequency range to be considered. It is the carrier frequency Fs/4 that is considered for this purpose in the presently disclosed case, since it renders possible a very simple design of the digital modulator 31. Of course, it is also possible to select another cosine frequency range to be considered, or another carrier frequency of the digital modulator 31. The signal amplitudes occurring in the case of the tone frequencies actually used, or the corresponding signal power values, can be detected again with the aid of a simple low-pass filter 24 with a downstream absolute value device 26 owing to the shifting of the frequency spectrum by Fs/4. Since the low-pass filter 24 is preferably designed in a way similar to FIG. 7, a frequency divider 25 with the divider factor N is again connected upstream of the absolute value device 26.

Figure 9:
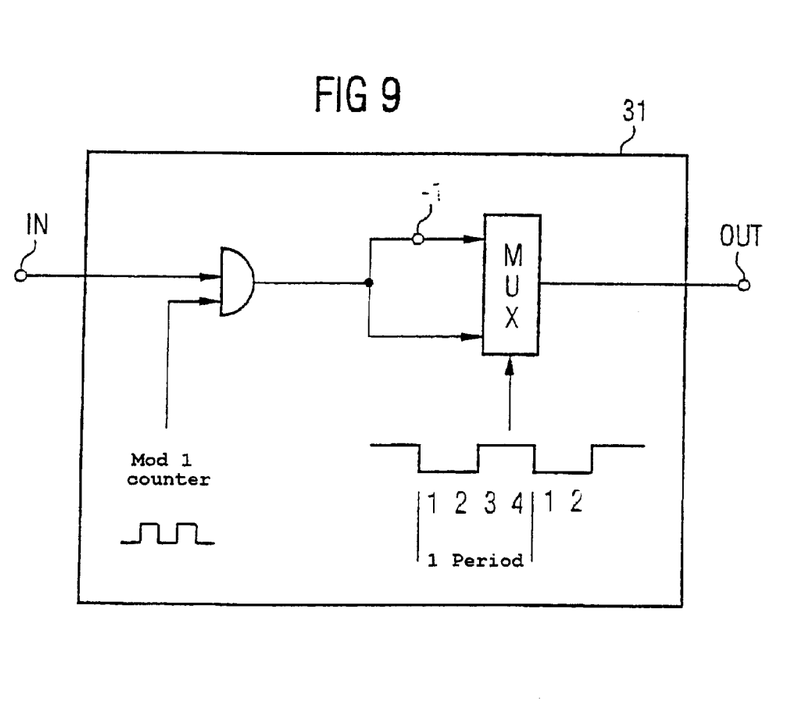
FIG. 9 shows a block diagram of a possible implementation in circuitry of a digital modulator, as illustrated in FIG. 8, for the carrier frequency Fs/4.

The shifting of the frequency spectrum by Fs/4 can be performed easily by virtue of the fact that the samples of the received test signal fed to the digital modulator 31 are multiplied periodically by 0, 1, 0 and −1. As a result, an example of a design of the digital modulator 31 shown in FIG. 8 is illustrated in FIG. 9. Here, the digital modulator 31 includes an AND gate on the input side, which is driven by a modulo 1 counter, and a multiplexer on the output side, which is driven by the signal represented below the multiplexer in FIG. 9. This signal switches the input signal through the multiplexer unchanged during the first two cycles of a multiplication period, and switches through the input signal of the multiplexer multiplied by −1 during the two last cycles of a multiplication period.

The task of the comparator unit 16 shown in FIG. 4 is to relate the amplitude of the nonlinear components, (i.e., the output signal of the nonlinearity detector 14) to the amplitude of the reference signal (i.e., the output signal of the cosine amplitude detector 15) by forming a quotient between the two output signals IN1 and IN2. An appropriate divider circuit is required for this purpose. However, instead of a divider circuit, the signal IN2 supplied by the cosine amplitude detector 15 may also be multiplied by a variable and programmable constant, which is smaller than 1, resulting in the simulation of a programmable limiting value which is then compared with the output signal IN1.

Figure 10:
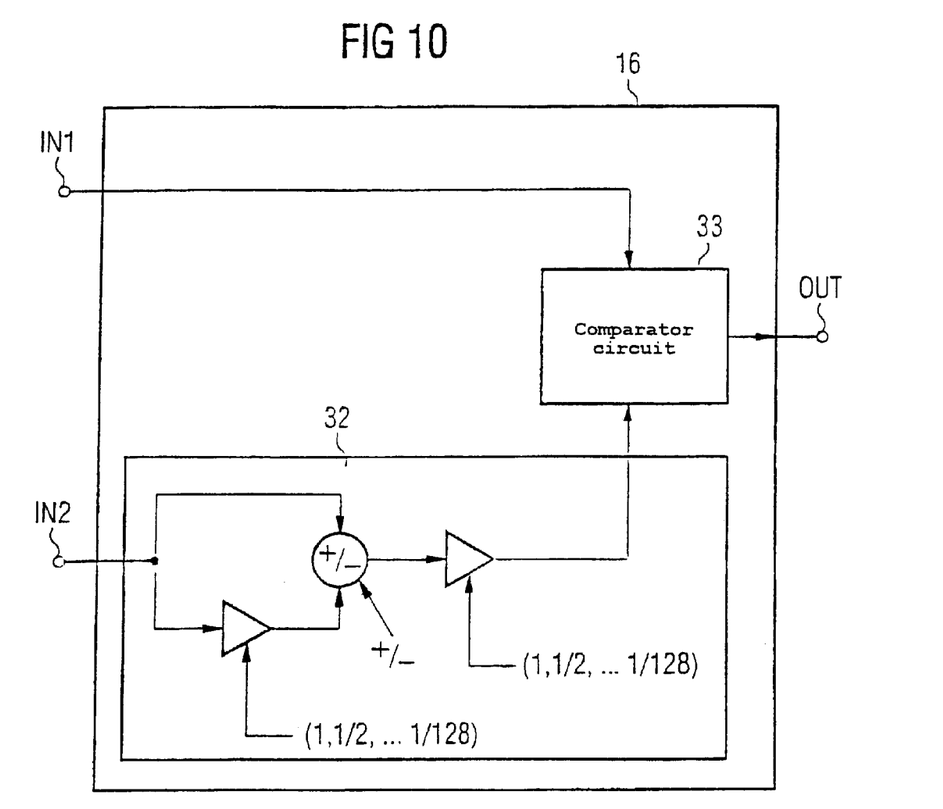
FIG. 10 shows a block diagram of a possible implementation in circuitry of a comparator unit as illustrated in FIG. 4.

A possible design of the comparator unit 16 is illustrated in FIG. 10. In a limiting value generator 32, the actual reference signal IN2 of the cosine amplitude detector 15 is multiplied by an appropriate constant smaller than 1 by means of two programmable bit shifting operations (corresponding to a multiplication by 1, ½, . $^{1}/_{128}$) and a programmable addition/subtraction operation. Like the adders/subtractors, the shifting factors of the two bit shifters can be programmed, and so the desired limiting value can be programmed by suitable settings. A comparator circuit 33 is then used to compare the signal IN1 supplied by the nonlinearity detector 14 with the limiting value supplied by the limiting value generator 32, in order to be able to determine the nonlinear properties of the communication channel.

It is noted that the shifting of the frequency spectrum can be performed, in particular, by the use of digital modulators such as are described, for example, in "On the reduction of hardware in digital modulators", L. Gazsi, IEEE Trans. On Communications, vol. COM-27, No. 1, January 1979, pages 221–228.

While the teachings of the present disclosure have been explained with respect to particular examples, it will be apparent to those of ordinary skill in the art to those of ordinary skill in the art that the scope of this patent is not limited to those examples. On the contrary, this patent covers all apparatuses falling within the spirit and scope of the appended claims, either literally or under the doctrine of equivalents.

What is claimed is:

1. An arrangement for analyzing nonlinear properties of a communication channel comprising:

a test signal generator device configured to generate a test signal comprised of a plurality of different tones and send the test signal via the communication channel, wherein tone frequencies of each of the plurality of different tones of the test signal are set to values from the set of i*Fs/n where i=1 ... n/2−1 and Fs denotes the sampling frequency and wherein at least one of the tone frequency values from the set of i*Fs/n is not used for a tone of the test signal; and an evaluation device configured to receive and evaluate the test signal transmitted via the communication channel, the evaluation device comprising:
  a first detector unit configured to detect the interference produced by the communication channel for tone frequency values that are not used for the test signal;
  a second detector unit configured to detect test signal amplitudes occurring for each of the tone frequency values used; and
  a comparator unit configured to relate respective output signals of the two detector units to one another in order to determine the nonlinear properties of the communication channel;
  wherein the first detector unit has one or more frequency spectrum shifting units configured to shift the frequency spectrum of the test signal transmitted via the communication channel by the individual tone frequency values not used for the test signal, and wherein the first detector unit includes one or more low-pass filters connected downstream of corresponding frequency spectrum shifting units in order to subject each frequency-shifted test signal to low-pass filtering, the first detector unit outputting a sum of the individual frequency-shifted and low-pass-filtered test signals as an output signal to the comparator unit.

2. The arrangement as claimed in claim 1, wherein a value is selected for n that is represented by a product of relatively small integral factors.

3. The arrangement as claimed in claim 1, wherein n is set equal to 24.

4. The arrangement as claimed in claim 1, wherein the test signal generator device generates the test signal as the sum of seven different cosine tone frequencies that have a specific phase relationship relative to one another.

5. The arrangement as claimed in claim 4, wherein the frequency spectrum of the first five cosine tone frequencies has substantially the same amplitude, and the frequency spectrum of the sixth cosine tone frequency corresponds to approximately 85% of the first five cosine tone frequencies, and the frequency spectrum of the seventh cosine tone frequency corresponds to approximately 35% of the amplitude of the first five cosine tone frequencies.

6. The arrangement as claimed in claim 4, wherein the first, second and fifth cosine tone frequencies are allocated to the phase 0°, and the remaining cosine tone frequencies are allocated to the phase 180°.

7. The arrangement as claimed in claim 3, wherein the test signal generator device does not use the tone frequency values of 2* Fs/24, 4* Fs/24, 8* Fs/24 and 10* Fs/24 to generate the test signal.

8. The arrangement as claimed in claim 1, wherein each of one or more frequency spectrum shifting units of the first detector unit comprise a digital modulator for each tone frequency value not used for the test signal, each digital modulator shifting the frequency spectrum of the test signal transmitted via the communication channel by the corresponding tone frequency value not used for the test signal.

9. The arrangement as claimed in claim 8, wherein a corresponding low-pass filter of the one or more low-pass filters is connected downstream of each digital modulator, the sum of the output signals of the individual low-pass filters being output to the comparator unit as the output signal by the first detector unit.

10. The arrangement as claimed in claim 9, wherein a frequency divider and an absolute value device are connected downstream of each low-pass filter, the first detector unit outputting as the output signal to the comparator unit the sum of the output signals of the individual absolute value devices.

11. The arrangement as claimed in claim 1, wherein the second detector unit comprises a digital modulator with a downstream low-pass filter, the digital modulator shifting the frequency spectrum of the test signal transmitted via the communication channel by a prescribed frequency value.

12. The arrangement as claimed in claim 11, wherein the prescribed frequency value by which the digital modulator of the second detector unit shifts the frequency spectrum of the test signal transmitted via the communication channel corresponds to the amount Fs/4.

13. The arrangement as claimed in claim 11, wherein the low-pass filter is connected via a frequency divider to an absolute value device whose output signal is fed to the comparator unit.

14. The arrangement as claimed in claim 9, wherein each low-pass filter is configured to sum N samples and output the sum result to a corresponding frequency divider after N sampling cycles, where N corresponds to a number of the samples of a period of the test signal and to a divider factor of a downstream frequency divider.

15. The arrangement as claimed in claim 8, wherein each digital modulator is configured to multiply each sample of the test signal transmitted via the communication channel by a constant sequence of factors prescribed for the corresponding digital modulator.

16. The arrangement as claimed in claim 15, wherein each digital modulator is configured to execute the multiplications by combining bit shifting operations and multiplexer operations.

17. The arrangement as claimed in claim 13, wherein the low-pass filter is configured to sum N samples and output the sum result to a corresponding frequency divider after N sampling cycles, where N corresponding to a number of the samples of a period of the test signal and to a divider factor of a downstream frequency divider.

18. The arrangement as claimed in claim 11, wherein the digital modulator is configured to multiply each sample of the test signal transmitted via the communication channel by a constant sequence of factors prescribed for the digital modulator.

19. The arrangement as claimed in claim 18, wherein the digital modulator is configured to execute the multiplications by combining bit shifting operations and multiplexer operations.

20. The arrangement as claimed in claim 1, wherein the comparator unit is configured to multiply the output signal supplied by the second detector unit by a variable factor and compare of the multiplication to the output signal supplied by the first detector unit in order to determine the nonlinear properties of the communication channel.

21. The arrangement as claimed in claim 20, wherein the comparator unit is configured in such a way that it implements the multiplication of the output signal supplied by the second detector unit by the variable factor with the aid of programmable bit shifting and at least one of adding and subtracting operations.

* * * * *